Dec. 9, 1952 — J. M. CHAMBERS — 2,620,610
TRANSPORT APPARATUS FOR TANDEM-HARROWS
Filed Feb. 21, 1949 — 5 Sheets-Sheet 1

INVENTOR.
JOHN M. CHAMBERS
BY W. M. Alexander
& E. J. Werlich
ATTORNEYS

Dec. 9, 1952 J. M. CHAMBERS 2,620,610
TRANSPORT APPARATUS FOR TANDEM-HARROWS
Filed Feb. 21, 1949 5 Sheets-Sheet 2
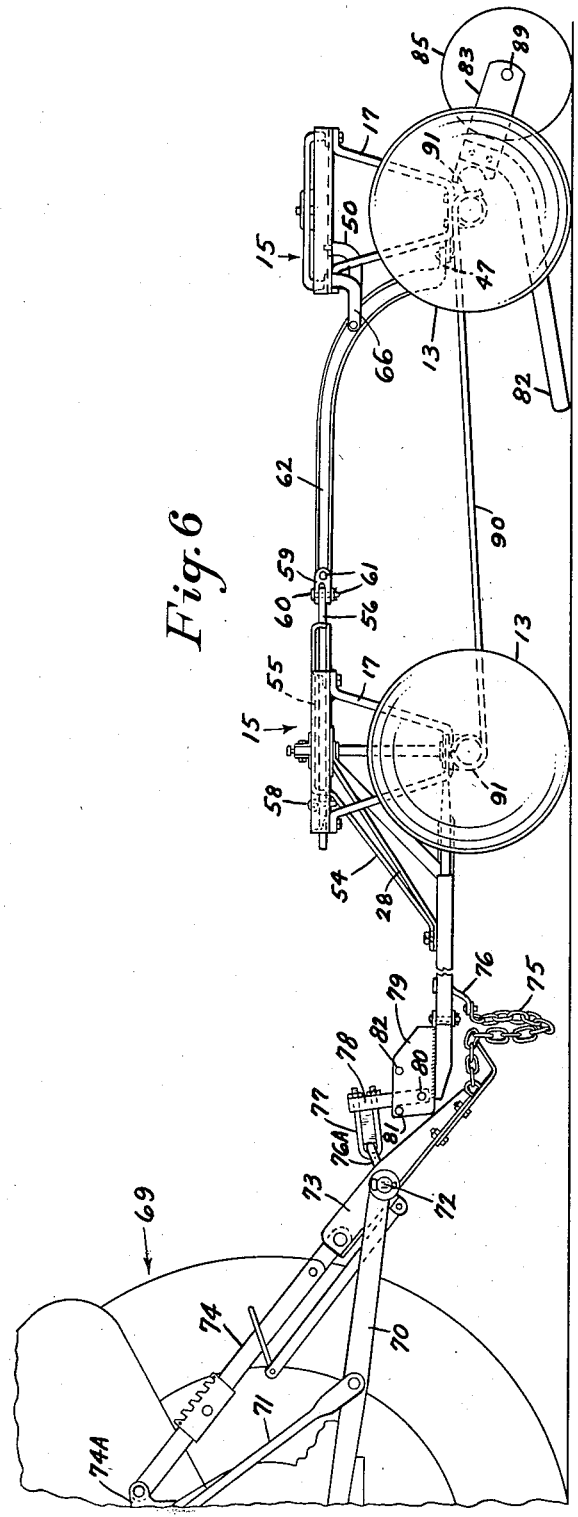
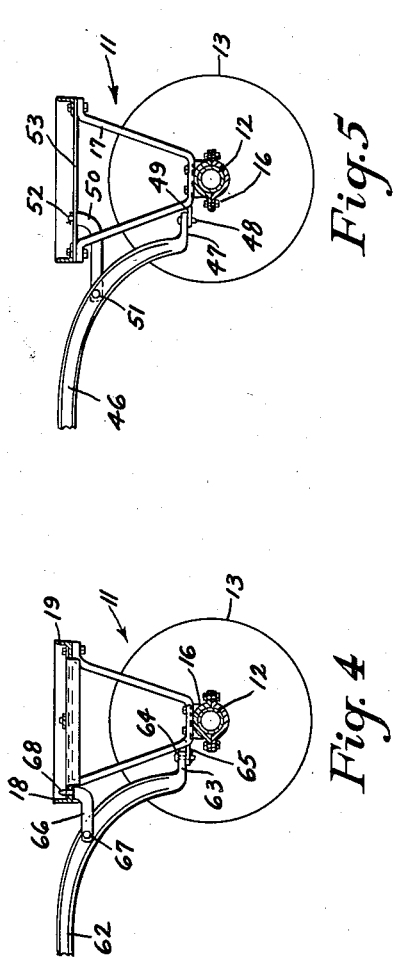
INVENTOR.
JOHN M. CHAMBERS
BY H. M. Alexander
& E. J. Herlick
ATTORNEYS Dec. 9, 1952 J. M. CHAMBERS 2,620,610
TRANSPORT APPARATUS FOR TANDEM-HARROWS
Filed Feb. 21, 1949 5 Sheets-Sheet 3

INVENTOR.
JOHN M. CHAMBERS
BY H. M. Alexander
& E. J. Herlich
ATTORNEYS

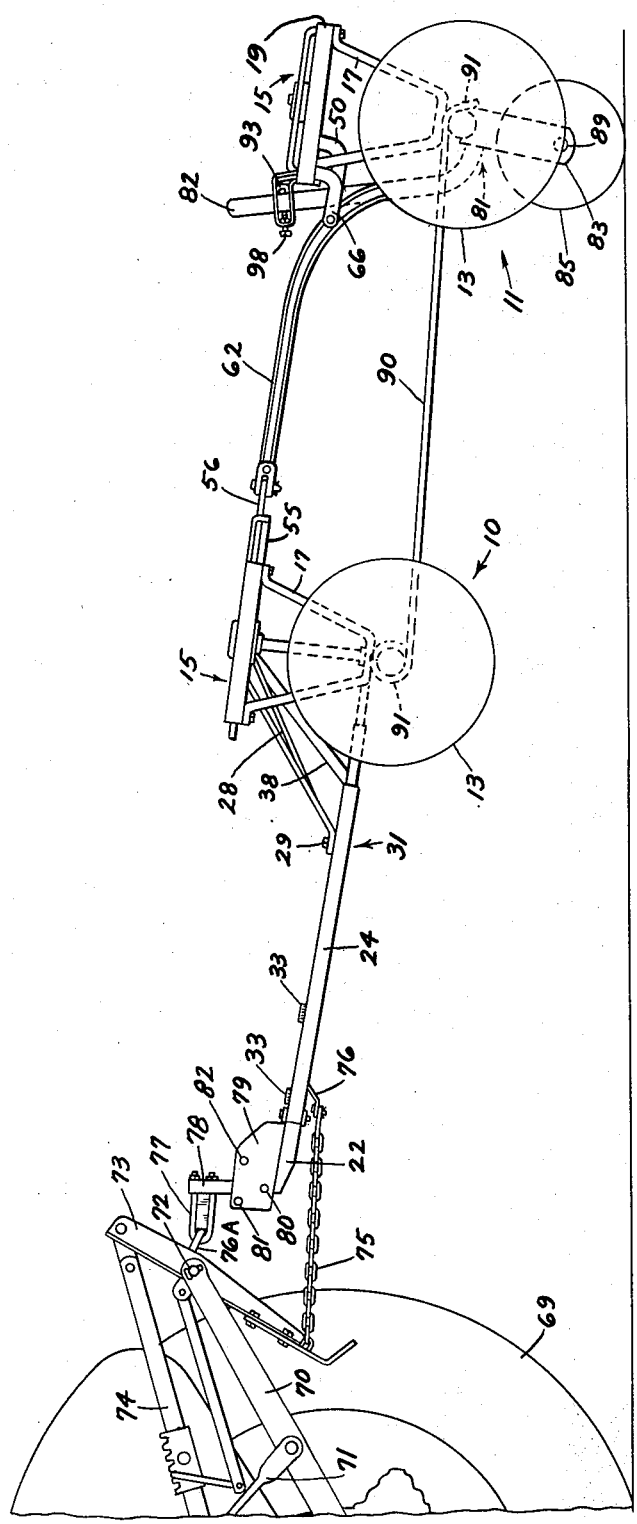

Dec. 9, 1952  J. M. CHAMBERS  2,620,610
TRANSPORT APPARATUS FOR TANDEM-HARROWS
Filed Feb. 21, 1949  5 Sheets-Sheet 5
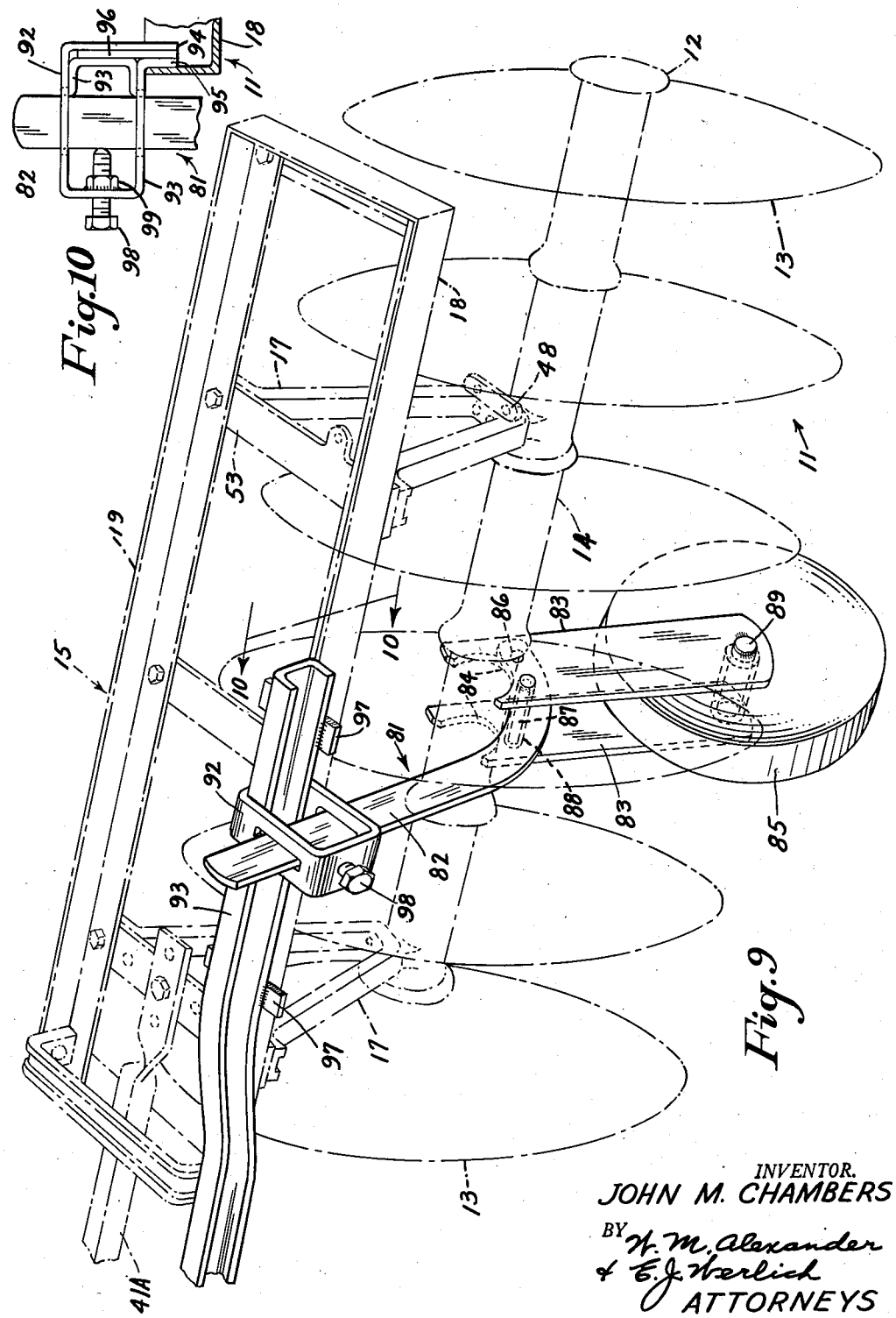
INVENTOR.
JOHN M. CHAMBERS
BY W. M. Alexander
& E. J. Werlich
ATTORNEYS Patented Dec. 9, 1952

2,620,610

UNITED STATES PATENT OFFICE 2,620,610

TRANSPORT APPARATUS FOR TANDEM-HARROWS

John M. Chambers, Leamington Spa, England, assignor to Harry Ferguson, Ltd., Coventry, England, a British company Application February 21, 1949, Serial No. 77,472
In Great Britain February 23, 1948

3 Claims. (Cl. 55—73)

1

The invention relates to a transport apparatus for use with a tractor-connected implement. More specifically, the transport apparatus may be used with an implement formed of articulated sections connected to an implement hitch on the trailer liftable by tractor power, whereby the transport apparatus and the tractor cooperate to transport the implement.

An implement formed of front and rear articulated sections, for example, a tandem disk harrow, can be drawn by a tractor through a power-lifted hitch, otherwise suitable for implements such as plows, which may be lifted by tractor power clear of the ground for transport. A tandem harrow is too heavy and extends too far to the rear to be lifted in this manner by a lightweight tractor, and moreover the harrow's construction is too "floppy" because of the pivotal connection of the front and rear gangs to make this type of lifting feasible.

An object of the present invention is to provide an improved transport apparatus for a tractor-connected implement formed of articulated parts. The implement may be connected to the tractor through a power-lifted hitch, which works with the transport apparatus to position the implement for transport.

Another object is to provide as part of, or for use with, a transport apparatus for a tractor-connected implement formed of articulated parts, ties extending between the articulated parts to make the implement be lifted as a rigid unit. Such an articulated implement may be a tandem disk harrow, in which case the front gangs may be tied to the rear gangs, and the rear gangs may be tied to one another.

Further objects and advantages will become apparent as the following description proceeds, taken in connection with the accompanying drawings in which:

Figure 1 is a plan view, showing the transport apparatus of the present invention applied to a tandem disk harrow.

Figs. 2, 3, 4, and 5 are section views taken on lines 2—2, 3—3, 4—4, and 5—5, respectively, of Fig. 1.

Fig. 6 is a side view, with parts omitted, showing the ties of the transport apparatus applied to the harrow and the jacks of the transport apparatus about to be applied.

Fig. 7 is a side view, with parts omitted, showing the ties and the jacks applied so that the rear harrow gangs are lifted.

Fig. 8 is a side view, with parts omitted, showing the transport apparatus completely applied

Figures 1, 2, 3:
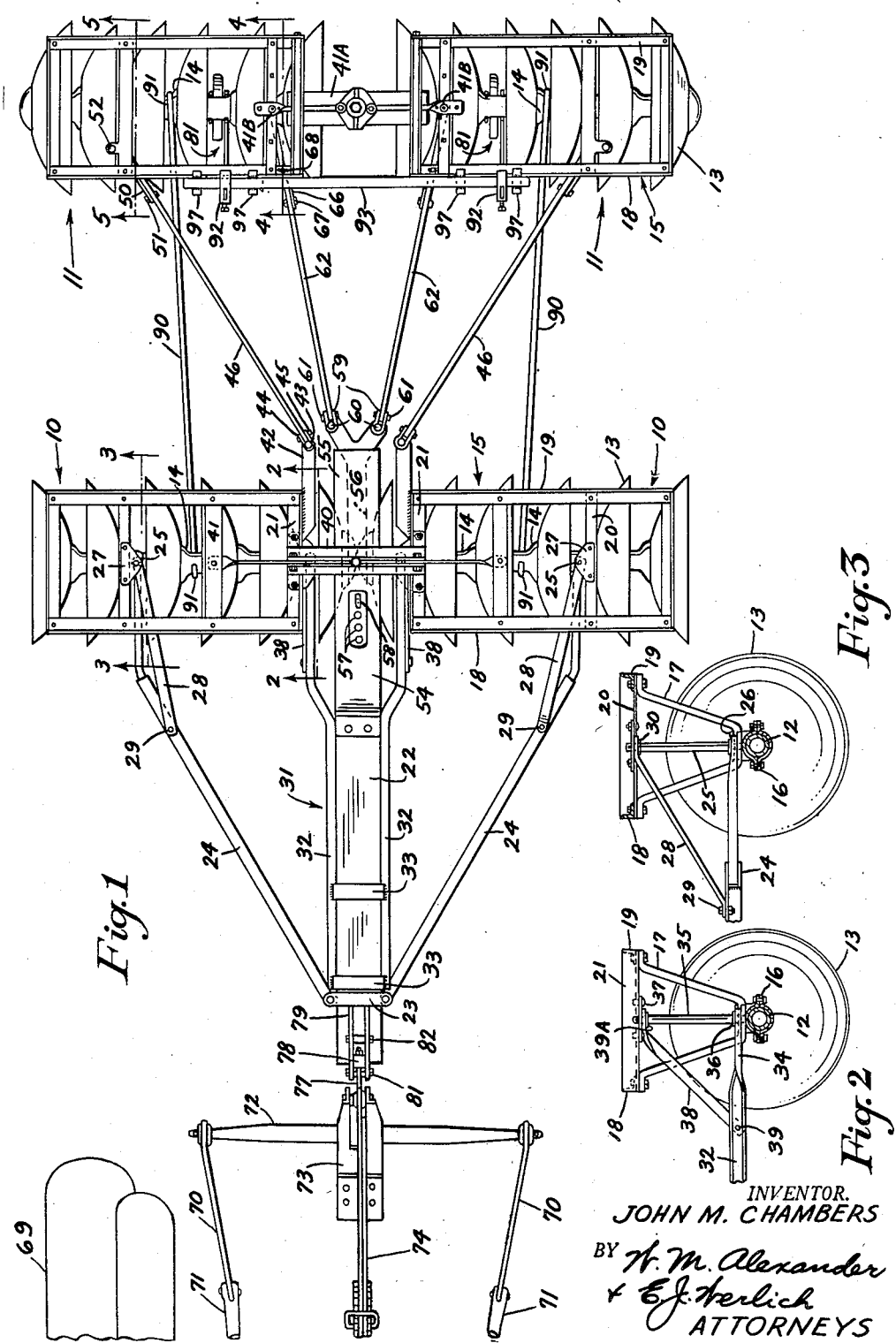
Figure 2:
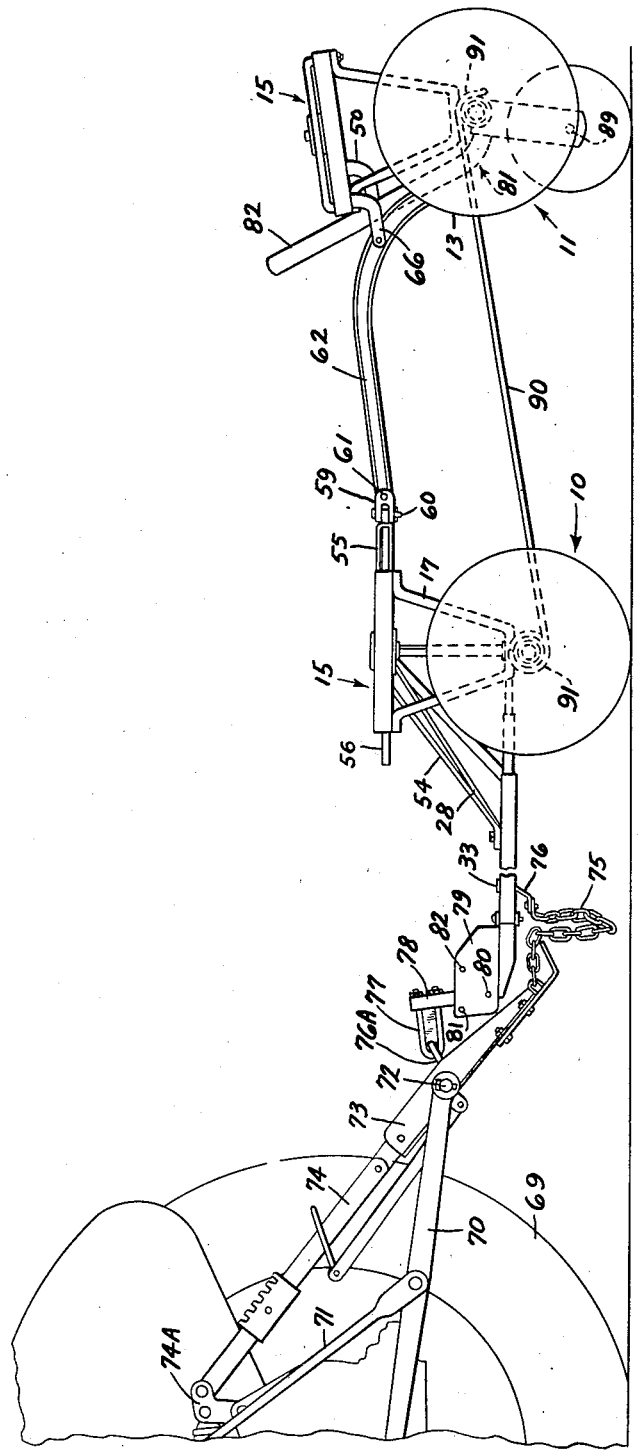

2 to the harrow, and a tractor hitch connected to the harrow raised so that both front and rear gangs are raised for transport.

Fig. 9 is a perspective view showing a portion of the transport apparatus applied to a rear harrow gang.

Fig. 10 is a sectional view on line 10—10 of Fig. 9.

Although the invention is susceptible of various modifications and alternative constructions and uses, I have shown in the drawings and shall herein describe in detail the preferred embodiment of the invention. It is to be understood, however, that I do not intend to limit the invention by such disclosure, but mean to cover all modifications and alternative constructions and uses falling within the spirit and scope of the invention as expressed in the appended claims.

The transport apparatus of the present invention is shown as applied to a tandem disk harrow as an example of an implement with which the apparatus may be used. As seen in Fig. 1, this harrow comprises two front gangs 10 and two rear gangs 11. Each gang comprises an axle 12, a plurality of disks 13 mounted thereon, spacers 14 between the disks, also on the axle 12, and a frame 15 positioned above the disks. The frame is positioned with respect to the axle 12 by means of two-part bearings 16 on the axle and V-members 17 suitably secured to the bearings and to angle members 18 and 19 forming the front and rear, respectively, of the frame, at the inner end of the gang (Figs. 2 and 4), and adjacent but spaced from the outer end of the gang (Figs. 3 and 5). A strap 20 extends across the frame 15 over each outer V-member 17 and is secured to the front and rear angles 18 and 19 of the frame between these angles and the ends of the V-member. The inner end of each gang is closed by an angle member 21, which fits under the inner ends of the front and rear angles 18 and 19 so as to go between them and the ends of the V-member 17.

A draft bar 22 extends forwardly from between the front gangs to a connection with a tractor, which will be described presently. To a cross piece 23 secured to the draft bar 22 are connected the front ends of arms 24. The rear ends of these arms are connected near but spaced from the outer ends of the front gangs 10 at the outer bearings 16 by means of a spindle 25, the lower end of which goes through the arm 24 and into the bearing 16, as shown in Fig. 3. The spindle 25 has a lower shoulder 26 by which it rests on the arm 24. The upper end of the spindle 25 extends through a piece 27 attached to the frame strap 20 and through a strap 28 connected at 29 to a region of the arm 24 spaced from its rear end. The strap 28 is held up just beneath the piece 27 on an upper shoulder 30 on the spindle 25. A slide 31 mounted on the draft bar 22 comprises side members 32 and spaced cross members 33 connecting the side members. The rear portions of the side members 32 are displaced outward away from the draft bar 22 and the very ends are turned over, as indicated at 34 in Fig. 2, so as to rest on the bearing 16 at the inner ends of the front gangs. A spindle 35 extends through the end 34 and into the bearing 16 to connect each side-member 32 with the bearing. The spindle has a lower shoulder 36 by which it rests on the end 34 of the side member 32. The upper end of the spindle 35 goes through a piece 37 secured to the inner end frame angle 21 and a strap 38, connected to the side member 32 at 39. An upper shoulder 39A on the spindle 35 holds the strap 38 up just beneath the piece 37. The front gangs 10 are interconnected by a bridge 40 having connections with the front gangs at 41, about which they may pivot for adjustment between working and transport positions. The rear gangs 11 are interconnected by a structure 41A, on which the rear gangs pivot at 41B.

Members 42 are secured to the inner frame angles 21 and extend rearwardly therefrom. To the rear end of each member 42 is pivotally connected by a vertical pin 43, a clevis 44, which is in turn connected by a horizontal pin 45 with the front end of a link 46. As shown in Fig. 5, the rear end of the link is curved downward and terminates in a horizontal flat portion 47, connected by a pin 48 to a piece 49 secured to the outer bearing 16 on a rear gang 11. A strap 50 is connected at one end at 51 to the link 46 and has at the other end a reduced portion 52 extending through and retained in a piece 53 connected between the front and rear angles 18 and 19 of the rear frame at the connection with the outer V-member 17.

To the rear end of the draft member 22 is secured a member inclining upwardly rearwardly at its front, as indicated at 54, and transversely tubular at its rear, as indicated at 55 in Fig. 7. A tongue 56 extends through the tubular portion 55 and through its front and rear walls. The front end of the tongue carries a plurality of openings 57 through any of which a pin 58 may be dropped to limit rearward movement of the tongue as shown in Fig. 1. To the bifurcated rear end of the tongue two clevises 59 are pivotally connected by vertical pins 60. Each clevis 59 is connected by a horizontal pin 61 to the front end of a link 62. The rear end of the link is downwardly curved and terminates in a horizontal flat portion 63 connected by a pin 64 to a piece 65 secured to the inner bearing 16 on a rear gang 11, as shown in Fig. 4. One end of a piece 66 is connected at 67 to the link 62 and its other end 68 is reduced and extends through and is retained in the front angle 18 of the rear frame 15.

Control of the angle of the harrow gangs is effected from power of a tractor 69, to which the harrow is connected. The tractor carries a hitch having two trailingly pivoted links 70, adapted to be raised by drop links 71, operated by cranks, actuated by an hydraulic ram in the tractor. The links 70 may be pivoted at their forward ends on opposite sides of the tractor body below and slightly forward of the tractor rear axle. Between the links 70 is connected a transverse drawbar 72. At a midportion of its length the drawbar 72 supports an intermediate portion of a vertical lever 73. The upper end of the vertical lever is connected to a link 74, in turn connected to the tractor through a rocker 74A as shown in Fig. 6. The lower end of the vertical lever has a lost-motion connection, for example, by a chain 75, with a depending portion 76 of the slide 31. Adjacent its connection with the tractor drawbar 72 the vertical lever 73 is connected with the harrow draft bar 22 by means of an eye 76A, a clevis 77, an upstanding arm 78, and a box-like casing 79. The arm 78 is pivotally connected through its lower end, as at 80, between the side walls of the casing 79, which is secured to the harrow draft bar. Forward and rearward motion of the arm 78 is limited by pins 81 and 82 extending between the side walls. When the tractor links 70 are raised, the vertical lever 73 is caused to move clockwise, as seen from a comparison of Figs. 7 and 8. The lower end of the lever moves forward, causing a similar movement of the slide 31 with respect to the harrow draft bar 22, which brings the harrow gangs to straightened or transport position.

Frequently it is desirable to transport the harrows with gangs not merely straightened, but with disks elevated and out of contact with the ground. For this purpose I have invented the transport apparatus that constitutes the invention of the present application.

In Fig. 9 there is shown in some detail a jack 81, which forms part of this transport apparatus. The jack comprises a stem 82 formed of a curved flat bar, arms 83 having bearing recesses 84 at their upper ends, and rests on a ground wheel 85 positioned between the lower ends of the arms 83. The stem 82 is secured to one arm 83 by a short rivet 86 and a long rivet 87, which extends through both arms 83 and cooperates with a sleeve 88 mounted on the long rivet to clamp the stem to the one arm and to space the two arms at their upper ends. At their lower ends the arms are spaced by an axle 89, secured to the arms and mounting the ground wheel 85.

After the harrow gangs have been straightened by raising of the tractor links 70, the links are lowered, and this is possible without disturbing the straightened condition of the gangs because of the lost motion provided by the chain 75 connecting the vertical lever 73 and the slide 31. Now two elongated S-members 90, also forming part of the transport apparatus of the present invention, are applied to the harrow gangs, hook-shaped ends 91 on the members 90 engaging the disk spacers or the gang axles 12, and thus in effect being applied to the gang axles. One S-member connects the right-hand front and rear gangs, and the other S-member, the left-hand front and rear gangs. Now two of the jacks 81 are brought to the rear gangs 11 from the rear, as viewed in Fig. 6, the bearing recesses 84 being made to engage the disk spacers 14, or in effect, the rear-gang axles 12 within the spacers. Thereupon the stems 82 are raised and the rear gangs are swung to the over-center position of Fig. 7, in which the rear-gang axles 12 are somewhat rearward of the ground-wheel axles 89. Movement of the rear gangs downward and rearward from the position of Fig. 7 is prevented by engagement of the stems 82 with the frame front angles 18.

Now transverse tie means, also forming part of the transport apparatus of the invention and comprising clamps 92 and a transverse member 93, is applied to the jacks 81 as shown in Fig. 9. Each clamp, which may be formed from a bent strip, has a rectangular shape, with offset end and corner portions 94 and 95 as shown in Fig. 10. A spacer 96, secured between the portions 94 and 95, cooperates therewith to form a retaining flange. The transverse member 93, shown in the form of a channel, extends through the clamps 92 and slidingly supports them on its ends between pairs of stops 97. The clamps are applied to the jack stems 82 so as to receive the latter through top and bottom openings in the rectangle, the flanges 94—95—96 on the clamps extending into the front angles 18 on the rear gangs 11, the stops 97 resting on the top of the front angles, and the transverse member 93 extending across the harrow from one rear gang to the other. Now screws 98, threaded through nuts 99 secured inside the clamps 92, are adjusted to clamp the stems 82 against the member 93 and the member against the clamps. Now the clamps are held against movement along the member 93 and prevent the jacks 81 from moving lengthwise of the member, or transversely of the harrow. Thus the rear gangs of the harrow are in effect rigidly clamped together against relative lateral angling, drooping, or other movement.

Now the tractor links 70 are raised, and upward movement of these links is transmitted through the tractor drawbar 72 and the harrow draft bar 22 to the front gangs 10 to raise them to the position of Fig. 8. The front gangs are lifted, because the S-members 90 have converted the harrow into a rigid unit in a fore-and-aft sense. Without these S-members the lifting of the tractor links 70 would merely cause the front gangs to tilt in a vertical plane rearwardly, without rising, about a horizontal pivot constituted by the horizontal pins 44 and 61. Application of the S-members to the harrow gangs prevents such tilting from taking place to an appreciable degree. It should be noted that, when the tractor links are raised, there can be no substantial tilting in a vertical plane, of the draft bar 22 and the slide 31 with respect to the front gangs 10, for the arms 24 and the side members 32 are each connected to the front gangs at vertically spaced points, since as shown in Figs. 2 and 3, the arms 24 and side members 34 are connected to the front gangs at the lower ends of the vertical spindles 25 and 35, and the strips 28 and 38 on the arms and the side members, to the front gangs at the upper ends of the spindles.

When the tractor 69 draws the harrow in the transport position of Fig. 8, the jack ground-wheels 85 tend to move rearwardly and bring the rear gangs out of over-center position. Such movement out of over-center position is prevented by engagement of flanges 94—95—96 on clamps 92 with the front angles 18 on the rear frames.

The rear gangs 11 cannot have substantial rearward tilting with respect to the links 46 and 62 because of the connections of these links with the rear gangs at vertically spaced points, with the help of the straps 50 and 66, as shown in Figs. 4 and 5. Consequently, the jacks 81 cannot tilt the rear gangs rearwardly or forwardly to a substantial extent, once the jacks have elevated the rear gangs to the over-center position and the clamps have been applied to the jacks.

I claim:
1. Transport apparatus for use with a tractor equipped with a vertically movable power lift and a connected tandem disc harrow having pairs of front and rear gangs adapted to be swung from an angled to a straightened position in response to the raising of the power lift, said apparatus comprising a pair of jack devices each including an elongated stem with a transport wheel journaled adjacent one end and a hook-like bearing intermediate its ends, said bearing being spaced from said wheel so as to engage the axle of one of the rear gangs and lift the same when the device is inserted beneath the gang with said stem in a substantially horizontal position and then the stem is swung to a generally upright position, means for retaining said stems in the upright positions and for locking the rear gangs together into a transversely rigid structure comprising an elongated bar extending transversely of the harrow across the rear gangs, a pair of clamping members mounted on said bar each engageable with the stem of one of said jacking devices and each having a part in clamping engagement with the adjacent gang, and tie rods extending from the axles of the rear gangs to the axles of the front gangs for holding the latter rigid with the rear gangs.

2. Transport apparatus for use with a flexible disc harrow having a pair of gangs adapted to swing about substantially vertical axes between straightened and angled positions, said apparatus comprising a pair of jack devices each including an elongated stem with a transport wheel journaled at one end and a hook-like bearing intermediate its ends, said bearing being spaced from said wheel so as to engage the axle of one of the gangs and lift the same when the device is inserted beneath the gang with said stem in a substantially horizontal position and then the stem is swung to a generally upright position, means for retaining said stems in the upright positions and for locking the gangs together into a transversely rigid structure comprising an elongated bar extending transversely across said gangs, a pair of clamp members mounted on said bar each having a part formed to engage the stem of one of said jack devices and a part formed to engage a portion of the adjacent gang, and a releasable clamping element associated with each member for effecting the clamping of the stem to the member and the member to the gang.

3. Transport apparatus for use with a disc harrow having a pair of gangs adapted to swing about substantially vertical axes between straightened and angled positions, said apparatus comprising a pair of jack devices each including an elongated stem with a transport wheel journaled at one end and a hook-like bearing intermediate its ends, said bearing being spaced from said wheel so as to engage the axle of one of the gangs and lift the same when the device is inserted beneath the gang with said stem in a substantially horizontal position and then the stem is swung to a generally upright position, means for retaining said stems in the upright positions and for locking the gangs together into a transversely rigid structure comprising an elongated bar extending transversely across said gangs, a pair of clamp members slidably mounted on said bar for adjustment longitudinally thereof, each of said members having an aperture for receiving the stem portion of one of said devices and a depending hook element engageable with a portion of the adjacent gang, and a clamping screw associated with each member operative to clamp the stem to said member, to clamp the member to said bar, and in cooperation with said hook to clamp the member and the bar to said gang.

JOHN M. CHAMBERS.

REFERENCES CITED

The following references are of record in the file of this patent:

UNITED STATES PATENTS

| Number | Name | Date |
|---|---|---|
| 555,143 | Wicks | Feb. 25, 1896 |
| 608,167 | Alshouse | Aug. 2, 1898 |
| 654,180 | Raber | July 24, 1900 |
| 1,025,767 | Waterman | May 7, 1912 |
| 1,901,183 | McKahin | Mar. 14, 1933 |
| 2,164,550 | Steward | July 4, 1939 |
| 2,398,147 | McKay | Apr. 9, 1946 |